(12) United States Patent
Tripp

(10) Patent No.: US 12,071,059 B2
(45) Date of Patent: Aug. 27, 2024

(54) CONTROLLING ATTACHMENT OF EQUIPMENT TO A VEHICLE DECK

(71) Applicant: Howe & Howe Inc., Waterboro, ME (US)

(72) Inventor: Forrest Joel Tripp, Saco, ME (US)

(73) Assignee: Howe & Howe Inc., Waterboro, ME (US)

( * ) Notice: Subject to any disclaimer, the term of this patent is extended or adjusted under 35 U.S.C. 154(b) by 751 days.

(21) Appl. No.: 17/192,242

(22) Filed: Mar. 4, 2021

(65) Prior Publication Data

US 2021/0276471 A1 Sep. 9, 2021

Related U.S. Application Data

(60) Provisional application No. 62/986,143, filed on Mar. 6, 2020.

(51) Int. Cl.
*B60P 3/00* (2006.01)
*A62C 27/00* (2006.01)
(Continued)

(52) U.S. Cl.
CPC ............... *B60P 1/02* (2013.01); *A62C 27/00* (2013.01); *A62C 31/00* (2013.01); *A62C 31/005* (2013.01);
(Continued)

(58) Field of Classification Search
CPC ...... B60P 1/02; B60P 3/00; B60P 3/16; B60P 1/6427; B60P 7/13; B61D 45/00
(Continued)

(56) References Cited

U.S. PATENT DOCUMENTS

| | | | | |
|---|---|---|---|---|
| 443,418 | A | * 12/1890 | Wallace | E05C 9/043 |
| | | | | 296/56 |
| 1,408,629 | A | * 3/1922 | Palmer | E05C 9/028 |
| | | | | 292/DIG. 57 |

(Continued)

FOREIGN PATENT DOCUMENTS

| | | | | |
|---|---|---|---|---|
| CA | 2364823 A1 | * 6/2002 | | E05C 9/02 |
| CN | 202961612 | 12/2012 | | |

(Continued)

OTHER PUBLICATIONS https://www.oed.com/dictionary/hook_n1?tab=meaning_and_use&tl=true Definition, Hook (Year: 2024).*
(Continued)

*Primary Examiner* — Hilary L Gutman
(74) *Attorney, Agent, or Firm* — BainwoodHuang

(57) ABSTRACT

Techniques control attachment of equipment to a vehicle deck. Such techniques involve positioning an equipment base that serves as a base of the equipment on the vehicle deck. Such techniques further involve extending a latching mechanism of the equipment base to provide a first latching width that captures the equipment base between a set of deck clamps and a deck jamb mounted to the vehicle deck to fasten the equipment to the vehicle deck. Such techniques further involve contracting the latching mechanism to provide the equipment base with a second latching width that enables the equipment base to escape from the set of deck clamps and the deck jamb mounted to the vehicle deck to unfasten the equipment from the vehicle deck.

18 Claims, 5 Drawing Sheets

(51) Int. Cl.

| | | |
|---|---|---|
| *A62C 31/00* | (2006.01) | |
| *B25J 5/00* | (2006.01) | |
| *B25J 11/00* | (2006.01) | |
| *B60K 13/02* | (2006.01) | |
| *B60P 1/02* | (2006.01) | |
| *B60T 7/12* | (2006.01) | |
| *B62D 21/09* | (2006.01) | |
| *B62D 55/06* | (2006.01) | |
| *F02M 35/10* | (2006.01) | |
| *F02M 35/104* | (2006.01) | |
| *F16D 65/28* | (2006.01) | |
| *B60P 3/16* | (2006.01) | |
| *F16D 121/16* | (2012.01) | |

(52) U.S. Cl.
CPC ............ *B25J 5/005* (2013.01); *B25J 11/008* (2013.01); *B60K 13/02* (2013.01); *B60P 3/00* (2013.01); *B60T 7/12* (2013.01); *B62D 21/09* (2013.01); *B62D 55/06* (2013.01); *F02M 35/10242* (2013.01); *F02M 35/104* (2013.01); *F16D 65/28* (2013.01); *B60P 3/16* (2013.01); *F16D 2121/16* (2013.01)

(58) Field of Classification Search
USPC .................................. 410/2; 292/256.65, 258
See application file for complete search history.

(56) References Cited

U.S. PATENT DOCUMENTS

| | | | | |
|---|---|---|---|---|
| 1,862,632 A * | 6/1932 | Perin | .................... | B60P 7/13 410/80 |
| 1,984,425 A * | 12/1934 | Peelle | .................... | B66B 13/06 187/331 |
| 2,503,368 A * | 4/1950 | Willetts | .................. | B61D 45/00 410/77 |
| 3,036,375 A * | 5/1962 | Schlosser, Jr. | ............ | F16M 3/00 29/467 |
| 3,101,067 A * | 8/1963 | Brydon | .................. | B63B 21/22 114/210 |
| 3,480,248 A * | 11/1969 | Lucchino | ................ | F16B 3/00 410/77 |
| 3,623,617 A * | 11/1971 | Nemessanyi | ........... | B66F 7/065 414/640 |
| 3,770,060 A | 11/1973 | Forsyth et al. | | |
| 3,785,323 A * | 1/1974 | Lantz | ..................... | B63B 21/22 114/210 |
| 3,826,516 A * | 7/1974 | Weber | ............... | B62D 53/0828 280/901 |
| 3,872,983 A * | 3/1975 | Chapman | .................. | B60P 3/07 410/6 |
| 3,984,117 A * | 10/1976 | Bates | ...................... | B60P 7/08 410/77 |
| 4,257,647 A * | 3/1981 | Gianessi | .................. | B60N 2/43 248/397 |
| 4,611,962 A | 9/1986 | Braly et al. | | |
| 5,016,858 A * | 5/1991 | Mitchell | ................ | B66F 7/065 296/26.07 |
| 5,046,913 A * | 9/1991 | Domek | .................... | B60R 5/04 24/514 |
| 5,450,928 A * | 9/1995 | Isogai | ....................... | B66F 7/08 187/215 |
| 5,513,869 A * | 5/1996 | Putnam | ............. | B62D 53/0828 280/901 |
| 5,730,414 A * | 3/1998 | Wenger | ............. | B62D 25/2072 224/42.32 |
| 6,094,870 A * | 8/2000 | Stacy | ........................ | B60P 3/34 52/126.5 |
| 6,761,248 B1 * | 7/2004 | Harbison | .............. | B66F 11/042 182/69.5 |
| 7,036,786 B1 * | 5/2006 | Schura | ................ | E04B 1/34347 248/346.03 |
| 8,474,554 B2 | 7/2013 | Howe et al. | | |
| 9,873,468 B2 | 1/2018 | Howe et al. | | |
| D814,736 S * | 4/2018 | Kritzer | .......................... | D34/28 |
| 10,745,065 B2 | 8/2020 | Howe et al. | | |
| D923,513 S | 6/2021 | Howe et al. | | |
| D926,631 S | 8/2021 | Howe et al. | | |
| D927,352 S | 8/2021 | Howe et al. | | |
| 11,305,627 B2 * | 4/2022 | Piche | ....................... | B60P 7/02 |
| 2004/0227369 A1 * | 11/2004 | Davidson | ............... | B60J 7/1614 296/26.07 |
| 2014/0314533 A1 * | 10/2014 | Seales | .................. | B60P 1/5428 414/542 |
| 2020/0377161 A1 | 12/2020 | Sawyer et al. | | |
| 2020/0377162 A1 | 12/2020 | Howe et al. | | |
| 2021/0078480 A1 * | 3/2021 | Birenheide | .......... | B61D 45/001 |
| 2021/0108895 A1 | 4/2021 | Howe et al. | | |

FOREIGN PATENT DOCUMENTS

| | | | | |
|---|---|---|---|---|
| CN | 104399212 A | * | 5/2015 | |
| CN | 204479047 U | * | 7/2015 | |
| CN | 209392639 | | 9/2019 | |
| CN | 112824147 A | * | 5/2021 | ............ B60P 1/6481 |
| CN | 114604160 A | * | 6/2022 | |
| CN | 114909173 A | * | 8/2022 | |
| DE | 3925708 C | * | 9/1990 | ............ B60R 9/055 |
| EP | 0025557 A1 | * | 3/1981 | ............ B60P 1/6427 |
| EP | 494675 A2 | * | 7/1992 | ......... F04D 29/4266 |
| FR | 2775227 A1 | * | 8/1999 | ......... B60N 2/01583 |
| FR | 2784628 A1 | * | 4/2000 | ......... B60N 2/01583 |
| GB | 494675 A | * | 10/1938 | |

OTHER PUBLICATIONS https://www.oxfordreference.com/display/10.1093/oi/authority.20110803100016696#:~:text=Vertical%20side%20of%20an%20aperture,a%20superincumbent%20load%20is%20sustained. Definition, Jamb (Year: 2024).*

International Search Report and the Written Opinion from International Searching Authority (US) for International Application No. PCT/US2021/021074, date of mailing Jun. 4, 2021, 22 pages.

* cited by examiner

CONTROLLING ATTACHMENT OF EQUIPMENT TO A VEHICLE DECK

CROSS REFERENCE TO RELATED APPLICATIONS

This is a regular utility patent application based on U.S. Application No. 62/986,143, filed on Mar. 6, 2020, and entitled "Methods and Apparatus for Vehicle", the contents and teachings of which are hereby incorporated by reference in their entirety.

BACKGROUND

Vehicular robots may be used in dangerous situations rather than risk human injury/life. Along these lines, a human user may remotely control such a vehicular robot from a safe distance to a carry out certain operations.

For example, such a robot may be used to apply water to an unsafe structure such as a burning object. To this end, the human user remotely drives the robot to within spraying range of the unsafe structure. The human user then remotely directs the robot to spray water over the unsafe structure.

SUMMARY

Improved techniques utilize a latching assembly having a base that extends to attach equipment to a vehicle deck and contracts to detach the equipment from the vehicle deck. Such a latching assembly enables the equipment to fasten to the vehicle and unfasten from the vehicle more quickly and in a less burdensome manner than manipulating conventional nuts and bolts to mount/unmount the equipment each time. Accordingly, such a latching assembly is well suited for certain types of vehicles such as robotic vehicles that require quick deployment to address dangerous emergency situations.

In a particular use case, the vehicle may be remotely controlled to maneuver near an unsafe structure to spray water over the unsafe structure. The vehicle may be further provisioned with specialized equipment such as a scissor lift, camera equipment, specialized equipment for deploying flame retardant material, combinations thereof, and so on. Such equipment may have been quickly attached to the vehicle deck using the latching assembly.

One embodiment is directed to a vehicle which includes a vehicle chassis constructed and arranged to move over terrain, a vehicle deck supported by the vehicle chassis, and a latching assembly that attaches equipment to the vehicle deck. The latching assembly includes a set of deck clamps that mounts to a set of clamp locations on the vehicle deck, a deck jamb that mounts to a jamb location on the vehicle deck, and an equipment base that serves as a base of the equipment. The equipment base provides a latching mechanism that extends to provide the equipment base with a first latching width that captures the equipment base between the set of deck clamps and the deck jamb and contracts to provide the equipment base with a second latching width that enables the equipment base to escape from the set of deck clamps and the deck jamb.

Another embodiment is directed to a latching assembly for attaching equipment to a vehicle deck. The latching assembly includes:
(A) a set of deck clamps constructed and arranged to mount to a set of clamp locations on the vehicle deck;
(B) a deck jamb constructed and arranged to mount to a jamb location on the vehicle deck; and
(C) an equipment base constructed and arranged to serve as a base of the equipment, the equipment base providing a latching mechanism that, when the set of deck clamps mounts to the set of clamp locations on the vehicle deck and the deck jamb mounts to the jamb location on the vehicle deck, extends to provide the equipment base with a first latching width that captures the equipment base between the set of deck clamps and the deck jamb and contracts to provide the equipment base with a second latching width that enables the equipment base to escape from the set of deck clamps and the deck jamb.

Yet another embodiment is directed to a method of controlling attachment of equipment to a vehicle deck. The method includes:
(A) positioning an equipment base that serves as a base of the equipment on the vehicle deck; and
(B) extending a latching mechanism of the equipment base to provide a first latching width that captures the equipment base between a set of deck clamps and a deck jamb mounted to the vehicle deck; and
(C) contracting the latching mechanism to provide the equipment base with a second latching width that enables the equipment base to escape from the set of deck clamps and the deck jamb mounted to the vehicle deck.

In some arrangements, the equipment base includes a base member, a latching member, and a lever constructed and arranged to transition between a first orientation and a second orientation relative to the base member. The lever and the latching member forming the latching mechanism which positions the latching member and the base member (i) in a first configuration that provides the first latching width when the lever is in the first orientation relative to the base member and (ii) in a second configuration that provides the second latching width when the lever is in the second orientation relative to the base member.

In some arrangements, the vehicle deck provides a horizontal surface. Additionally, the lever pivots about an axis that is parallel to the horizontal surface.

In some arrangements, the base member defines a set of protrusions. Additionally, the latching member defines a plunger tip. Furthermore, the set of protrusions and the plunger tip are separated by the first latching width when the lever is in the first orientation relative to the base member. Also, the set of protrusions and the plunger tip are separated by the second latching width when the lever is in the second orientation relative to the base member.

In some arrangements, the base member extends laterally to continuously contact the vehicle deck. Accordingly, the base member is able to richly and robustly support the equipment when the lever is in the first orientation relative to the base member to latch the base member to the vehicle deck.

In some arrangements, the vehicle deck defines a pattern of holes. Additionally, each deck clamp includes a flat portion defining a set of holes to align with at least one hole of the pattern of holes defined by the vehicle deck to enable hardware to fasten that deck clamp to the vehicle deck. Furthermore, the deck jamb includes a flat portion defining a set of holes to align with at least one hole of the pattern of holes defined by the vehicle deck to enable hardware to fasten the deck jamb to the vehicle deck.

In some arrangements, each deck clamp further includes a hook portion coupled with the flat portion of that deck clamp. Additionally, the deck jamb further includes a stop portion coupled with the flat portion of the deck jamb.

Furthermore, the hook portion of each deck clamp defines a groove that is separated from the stop portion of the deck jamb by the first latching width.

In some arrangements, the stop portion of the deck jamb defines an orifice that receives a plunger tip at an end of the latching member. For example, the orifice may be smaller than the entire plunger tip preventing the plunger tip from passing completely through the orifice and enabling effective capture by the deck jamb.

In some arrangements, the set of deck clamps includes a pair of deck clamps disposed on the vehicle deck adjacent an end of the vehicle. Additionally, the deck jamb is disposed on the vehicle deck adjacent another end of the vehicle.

In some arrangements, the latching assembly further includes a second pair of deck clamps disposed on the vehicle deck at a mid-region between the ends of the vehicle. Additionally, the base member defines multiple pairs of protrusions to engage the pair of deck clamps and the second pair of deck clamps.

In some arrangements, the vehicle further includes a second latching assembly that attaches the equipment to the vehicle deck. The second latching assembly includes:
  (i) a second set of deck clamps that mounts to a second set of clamp locations on the vehicle deck,
  (ii) a second deck jamb that mounts to a second jamb location on the vehicle deck, and
  (iii) a second equipment base that serves as a second base of the equipment, the second equipment base providing a second latching mechanism that extends to provide the second equipment base with the first latching width that captures the second equipment base between the second set of deck clamps and the second deck jamb and contracts to provide the second equipment base with the second latching width that enables the second equipment base to escape from the second set of deck clamps and the second deck jamb.

In some arrangements, the equipment base is elongated in shape and extends along an equipment base axis. Additionally, the second equipment base is elongated in shape and extends along a second equipment base axis. Furthermore, the equipment base and the second equipment base are constructed and arranged to attach to the vehicle deck with the equipment base axis parallel to the second equipment base axis.

In some arrangements, the equipment includes a scissor lift. Additionally, the equipment base and the second equipment base forms a bottom of the scissor lift.

In some arrangements, the equipment further includes actuators coupled with the equipment bases. The actuators are constructed and arranged to control height of the scissor lift. Such height control may be under remote control of a human operator.

Other embodiments are directed to apparatus, devices, assemblies, and so on. Some embodiments are directed to various methods, systems, and componentry which are involved in controlling attachment of equipment to a vehicle deck.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique utilizes a latching assembly having a base that extends to attach equipment to a vehicle deck and contracts to detach the equipment from the vehicle deck. Such a latching assembly enables the equipment to fasten to the vehicle and unfasten from the vehicle more quickly and in a less burdensome manner than manipulating conventional nuts and bolts to mount/unmount the equipment each time. Accordingly, such a latching assembly is well suited for fastening equipment to certain types of vehicles such as robotic vehicles that may require quick deployment to address dangerous emergency situations.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
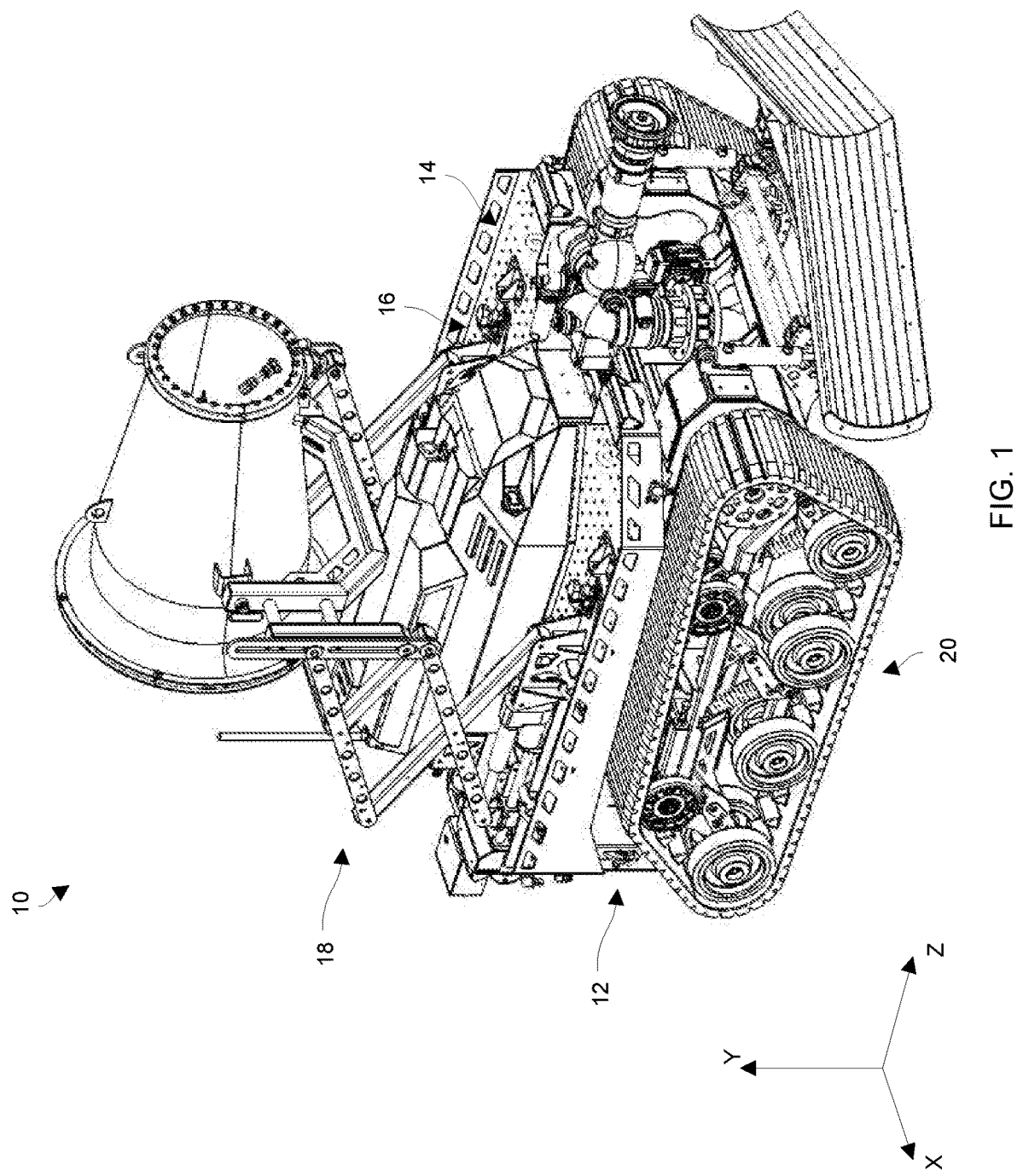
FIG. 1 is a perspective view of a vehicle which utilizes a latching assembly in accordance with certain embodiments.

FIG. 1 shows a vehicle 10 which utilizes a latching assembly in accordance with certain embodiments. The vehicle 10 includes a vehicle chassis 12, a vehicle deck 14, and one or more latching assemblies 16 that attach equipment 18 to the vehicle deck 14.

The vehicle chassis 12 is constructed and arranged to move over ground surfaces. Such ground surfaces may include a variety of different terrains such as pavement, soil, rocks, ditches, debris, icy or wet surfaces, and so on. In some arrangements, to accommodate variation in the terrain and/or extreme terrain conditions, the vehicle chassis 12 includes track assemblies 20 to enable the vehicle 10 to cross such terrain in a manner similar to that of a tank.

The vehicle deck 14 is supported by the vehicle chassis 12 and is constructed and arranged to carry various equipment 18. In some arrangements, the vehicle deck 14 includes one or more panels that provides a horizontal mounting platform (or surface) capable of supporting various types of equipment 18. Examples of such equipment 18 include a scissor lift, camera/sensor equipment, specialized equipment for deploying flame retardant material, specialized robotics, other types of equipment, combinations thereof, and so on. It should be understood that the vehicle chassis 12 and the vehicle deck 14 may have different geometries, weights/sizes/scales/etc., footprints, purposes, and so on, which are different than those shown in FIG. 1.

The latching assembly 16 is constructed and arranged to attach the equipment 18 to the vehicle deck 14. As will be explained in further detail shortly, the vehicle 10 may be provisioned with one or more latching assemblies 16 (e.g., to latch multiple pieces of equipment 18, to latch a single piece of equipment 18 via multiple latching assemblies 16, etc.). Each latching assembly 16 includes a latching mechanism that enables quick and simple attachment of the equipment 18 to, and quick and simple detachment of the equipment 18 from the vehicle deck 12.

During operation, the vehicle 10 is able to travel over terrain as well as carry the equipment 18. To cross terrain, the vehicle 10 may receive and respond to a remote control signal from a human operator operating a controller. Additionally, the equipment 18 may include robotics under similar remote control. For example, the human operator may remotely aim the equipment 18 toward a burning target and direct the equipment 18 to deploy flame retardant material onto the burning target.

It should be understood that the vehicle 10 is capable of driving over terrain and operating the equipment 18 simultaneously. It should be further understood that the vehicle 10 and the equipment 18 may be manually operated via local controls at the vehicle 10 itself. Further details will now be provided with reference to FIGS. 2 through 4.

Figure 2:
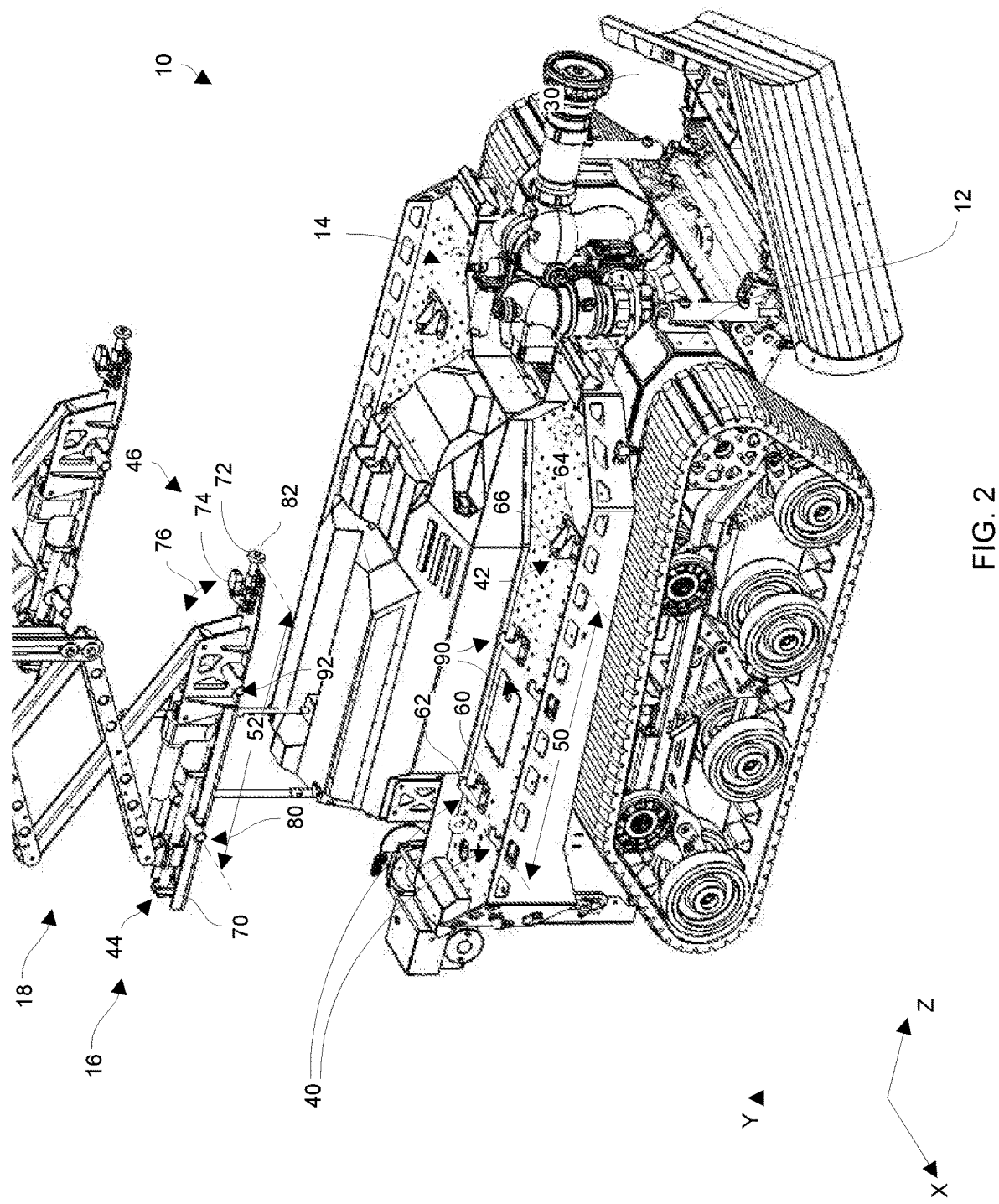
FIG. 2 is a close-up perspective view of particular example details in accordance with certain embodiments.
Figure 3:
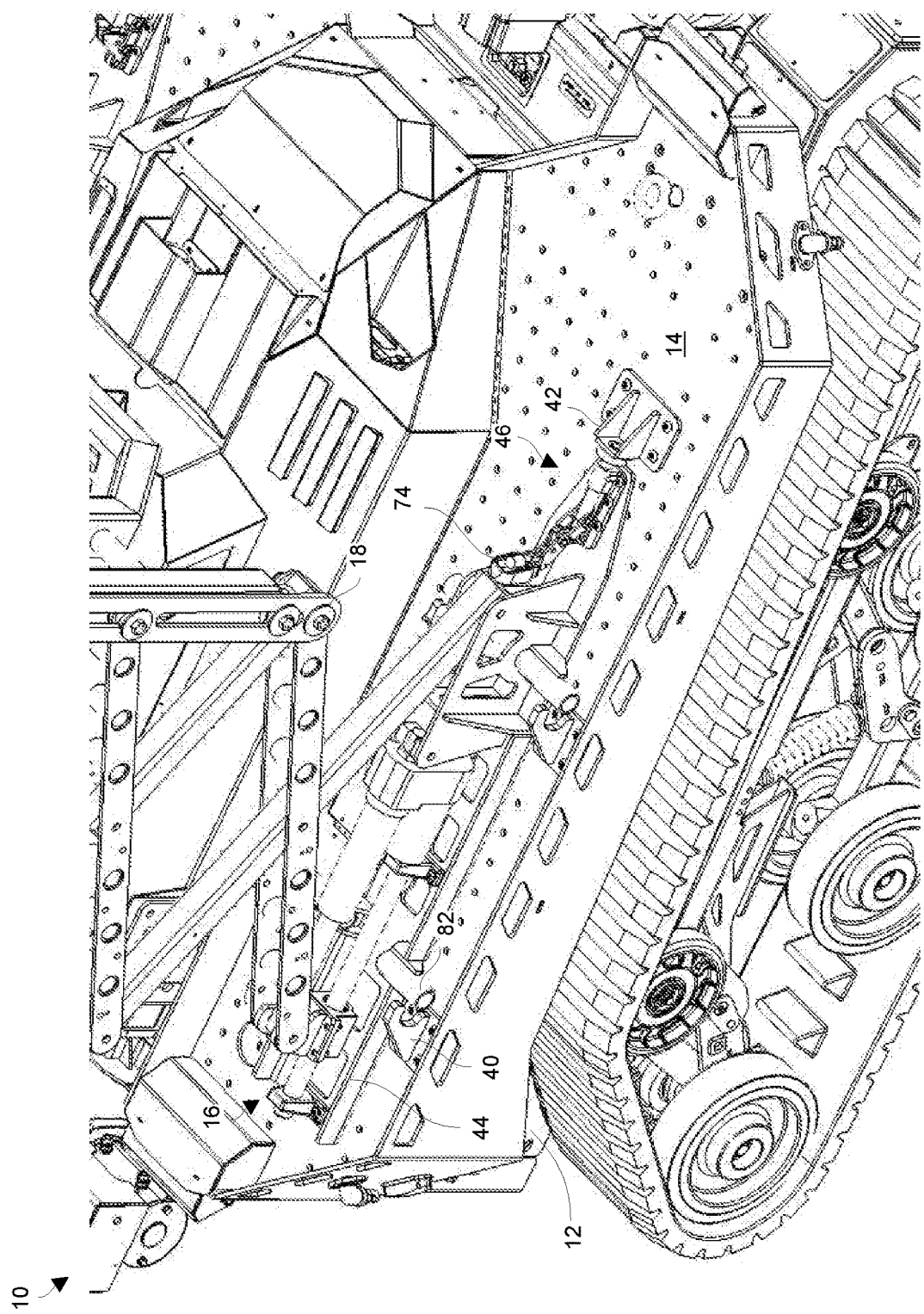
FIG. 3 is a close-up perspective view of additional example details in accordance with certain embodiments.
Figure 4:
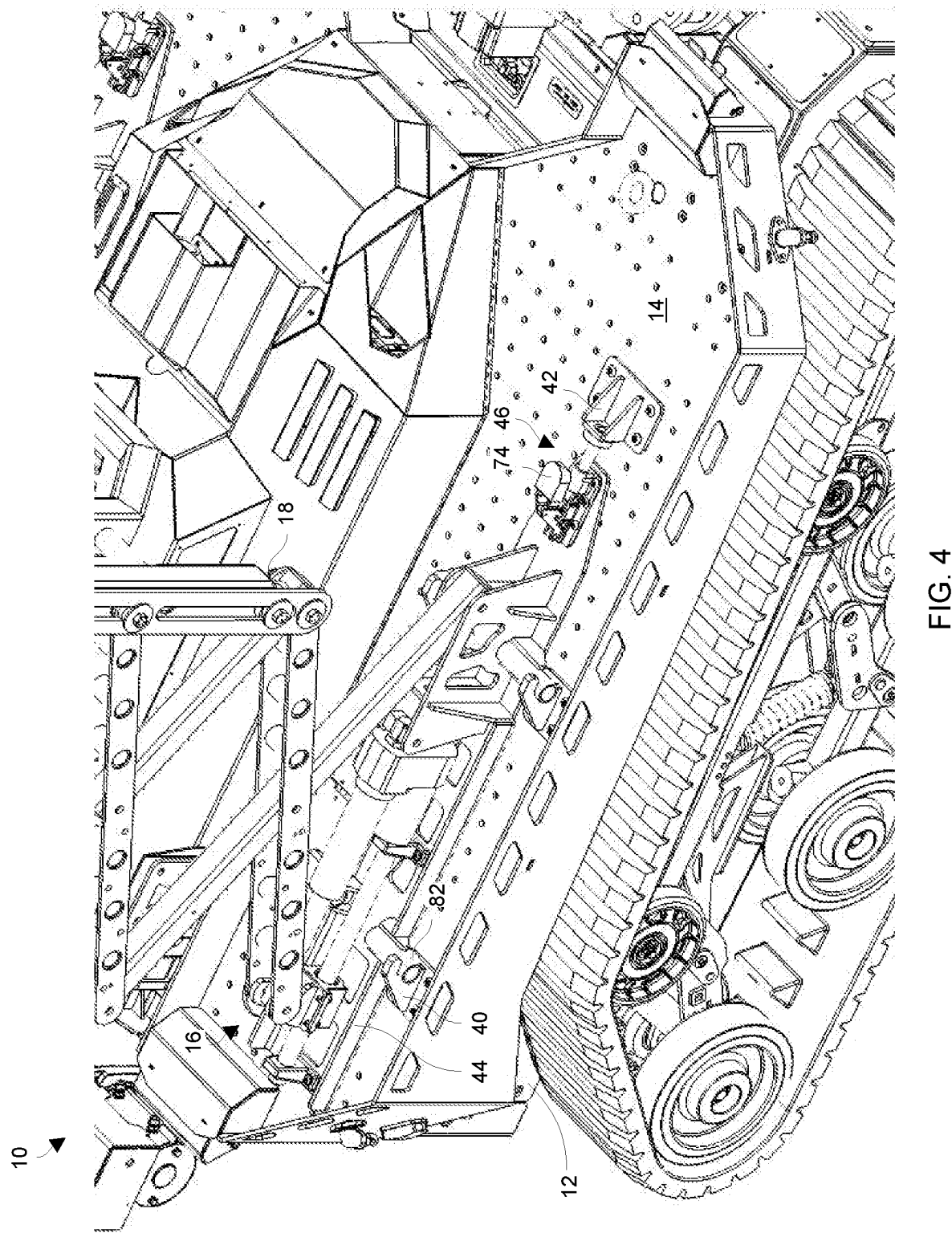
FIG. 4 is a close-up perspective view of further example details in accordance with certain embodiments.

FIGS. 2 through 4 show an equipment attachment sequence in accordance with certain embodiments. FIG. 2 shows the equipment 18 disconnected from the vehicle 10. FIG. 3 shows the equipment 18 sitting on the vehicle deck 14 of the vehicle 10. FIG. 4 shows the equipment 18 richly and robustly attached to the vehicle deck 14 of the vehicle 10.

As shown in FIG. 2, the vehicle deck 14 defines a horizontal mounting surface (extending in the X-Z plane) and a pattern of mounting holes 30. The pattern of mounting holes 30 enables different sized equipment bases to mount to the vehicle deck 14 using the same latching mechanism. In some arrangements, the vehicle deck 14 is formed by a set of panels fastened to the vehicle chassis 12 about the suspension.

By way of example only, the equipment 18 that attaches to the vehicle 10 is a scissor lift perhaps supporting other equipment such as a specialized device that deploys flame retardant material. Accordingly, multiple latching assemblies 16 are employed to attach a single piece of equipment 18 by way of example. However, it should be understood that a different number of latching assemblies 16 may be used in other embodiments such as one, three, four, and so on.

Each latching assembly 16 includes a set of deck clamps 40 (e.g., a pair of deck clamps 40) that mounts to a set of clamp locations on the vehicle deck 14, a deck jamb 42 that mounts to a jamb location on the vehicle deck, and an equipment base 44 that serves as a base (or a portion of the base) of the equipment 18. The equipment base 44 has a latching mechanism 46 that extends (e.g., along the Z-axis) to provide the equipment base 44 with a first latching width 50 that captures the equipment base 44 between the set of deck clamps 40 and the deck jamb 42 and contracts to provide the equipment base with a second latching width 52 that enables the equipment base 44 to escape from the set of deck clamps 40 and the deck jamb 42.

In further detail, each deck clamp 40 includes a flat portion 60 defining a set of holes to align with at least one hole of the pattern of holes 30 defined by the vehicle deck 14 to enable hardware to fasten that deck clamp 40 to the vehicle deck 14. Each deck clamp 40 further includes a hook portion 62 coupled with the flat portion 60 of that deck clamp 40. The hook portion 62 of each deck clamp 40 defines a groove having a geometry and size to capture a portion of the equipment base 44.

Similarly, each deck jamb 42 includes a flat portion 64 defining a set of holes to align with at least one hole of the pattern of holes 30 defined by the vehicle deck 14 to enable hardware to fasten the deck jamb 42 to the vehicle deck 14. Each deck jamb 42 further includes a stop portion 66 coupled with the flat portion 64 of that deck jamb 42.

The distance between the grooves provided by the hook portions 62 of the deck clamps 40 and the stop portions 66 of the deck jambs 42 is the first latching width 50. Accordingly, when the equipment base 44 is extended (e.g., along the Z-axis) to the first latching width 50 from the second latching width 52, the equipment base 44 is captured between the set of deck clamps 40 and the deck jamb 42 thus attaching the equipment base 44 to the vehicle deck 14. However, when equipment base 44 is contracted to the second latching width 52 from the first latching width 50, the equipment base 44 may escape from the set of deck clamps 40 and the deck jamb 42 thus detaching the equipment base 44 from the vehicle deck 14.

In accordance with certain embodiments, the hook portions 62 of the deck clamps 40 face toward the front of the vehicle 10 (e.g., the positive Z-direction). Accordingly, any forces that may push the equipment 18 from front to back (e.g., the negative Z-direction) such as recoil from equipment operation, merely urges the equipment base 44 more tightly into the grooves of the deck clamps 40.

As further shown in FIG. 2, the equipment base 44 includes a base member 70, a latching member 72, and a lever 74. The lever 74 and the latching member 72 form the latching mechanism 46. As shown by the double arrow 76 in FIG. 2, the lever 72 pivots about an axis that is parallel to the horizontal surface (e.g., about the X-axis) to extend/retract the latching member 72. In some arrangements, the latching mechanism 46 includes other components such as a pin, linkage, a spring, combinations thereof, etc. to facilitate actuation, leverage, retention in locked/unlocked states, and so on.

During operation, the level 74 is constructed and arranged to transition between a first orientation (e.g., where the lever 74 points in the positive Y-direction) and a second orientation (e.g., where the lever 74 points in the positive Z-direction) relative to the base member 70. In response to such operation, the latching member 72 moves relative to the base member 72 between a first configuration that provides the first latching width 50 (i.e., when the lever 74 is in the first orientation relative to the base member 70) and in a second configuration that provides the second latching width 52 (i.e., when the lever 74 is in the second orientation relative to the base member 70).

In further detail, the base member 70 of each latching assembly 16 defines a set of protrusions (or includes a set of pins) 80. Additionally, the latching member 72 (which may be elongated and extend along the base member 70) defines a plunger tip 82 constructed and arranged to be received by an orifice in the stop portion 66 of the deck jamb 42. It is the distance between the protrusions 80 and the plunger tip 82 that provides the latching widths 50, 52 depending on the orientation of the lever 74. That is, the set of protrusions 80 and the plunger tip 82 are separated by the first latching width 50 when the lever 74 is in the first orientation relative to the base member 70. Additionally, the set of protrusions 80 and the plunger tip 82 are separated by the second latching width 52 when the lever 74 is in the second orientation relative to the base member 70.

As further shown in FIG. 2, the deck clamps 40 may be disposed at one end of the vehicle 10 (e.g., toward the back) and the deck jamb 42 may be disposed at another end of the vehicle 10 (e.g., toward the front). Such a configuration enables the equipment base 44 to distribute the equipment weight evenly across the vehicle deck 14 between the front and back. In particular, the base member 70 of the equipment base 44 may provide continuous contact along the vehicle deck 14 to support the equipment 18. Moreover, when multiple latching assemblies 16 are employed laterally (e.g., also see FIG. 2), the equipment weight is evenly distributed across the vehicle deck 14 side to side.

In accordance with certain embodiments, each latching assembly 16 includes a second pair of deck clamps 90 which mount to the vehicle deck 14 at a mid-region between the ends of the vehicle 10. Additionally, the base member 70 of each equipment base 44 defines additional protrusions (or pins) 92 to engage the second pair of deck clamps 90. Such use of multiple pairs of deck clamps 40, 90 and multiple pairs of protrusions 80, 92 provides for stronger and more reliable equipment attachment.

Along these lines, with the grooves of the pairs of deck clamps 40, 90 facing forward (e.g., in the positive Z-direction), any urging of the equipment 18 toward the back of the vehicle 10 pushes the protrusions 80, 92 more tightly into the grooves. Moreover, with multiple pairs of deck clamps 40, 90 staggered at different locations front to back (e.g., along the Z-axis), the equipment base 44 is prohibited from torqueing up and detaching from the vehicle deck 14 due to such movement.

It should be understood that portions of the latching assemblies 16 may be substantially integrated with the equipment 18. For example, as shown in FIG. 2, the equipment bases 44 of multiple latching assemblies 16 form bottom portions of a scissor lift. To this end, robotic actuators are coupled with the equipment bases 44 for remotely controlling scissor lift height (e.g., to expand/contract the scissor lift vertically). Further equipment attachment details will now be provided.

Initially, the equipment 18 is disconnected from the vehicle deck 18 as shown in FIG. 2. By way of example only, the equipment 18 utilizes two latching assemblies 16. Additionally, the latching mechanisms 46 of the latching assemblies 16 are contracted (or open).

To attach equipment 18 to the vehicle deck 14, the equipment 18 can be lifted into place over the vehicle 10. In particular, the equipment bases 44 of the latching assemblies 16 are aligned over appropriate locations defined by the deck clamps 40 and the deck jambs 42.

Next, the equipment 18 is set down on top of the vehicle deck 14 while the latching mechanisms 46 remain contracted as shown in FIG. 3. Here, the equipment bases 44 are not yet captured by the deck clamps 40. In particular, the protrusions 82 are immediately in front of the grooves defined by the deck clamps 40 (e.g., also see the hook portions 62 in FIG. 2).

Furthermore, the levers 74 remain in their initial orientation (e.g., pointing in the positive Y-direction). Accordingly, the equipment bases 44 are only extended to the second latching width 52 and are thus too short to properly fasten to the vehicle deck 14.

Then, the levers 74 are moved to actuate the latching mechanisms 46 (e.g., pointing in the positive Z-direction) as shown in FIG. 4. In response, the equipment bases 44 extend to the first latching width 52. That is, the plunger tips 82 (FIG. 2) of the latching members 72 move forward to engage the deck jambs 42 (e.g., to mate with orifices defined by the stop portions 66 of the deck jambs 42). As a result, the equipment bases 44 slide back (i.e., in the negative Z-direction) enabling the protrusions 82 to engage the grooves defined by the deck clamps 40.

The levers 74 lock into place (e.g., pointing in the positive Z-direction) to keep the equipment base 44 securely mounted to the vehicle deck 14 and ready to operate further. While the levers 74 are locked in place and the equipment bases 44 are extended to the first latching width 50 to tightly engage the deck clamps 40 and the deck jamb 42. Accordingly, the latching assemblies 16 richly and robustly anchor the equipment 18 to the vehicle deck 14.

It should be understood that, to detach the equipment 18 from the vehicle deck 14, the levers 74 are actuated in the opposite direction. In response, the equipment bases 44 contract to the second latching width 52. Accordingly, the equipment 18 may then be moved forward (in the positive Z-direction) to disengage the protrusions 82 from the grooves defined by the deck clamps 40. The equipment 18 may then be lifted from the vehicle deck 14. Further details will now be provided with reference to FIG. 5.

Figure 5:
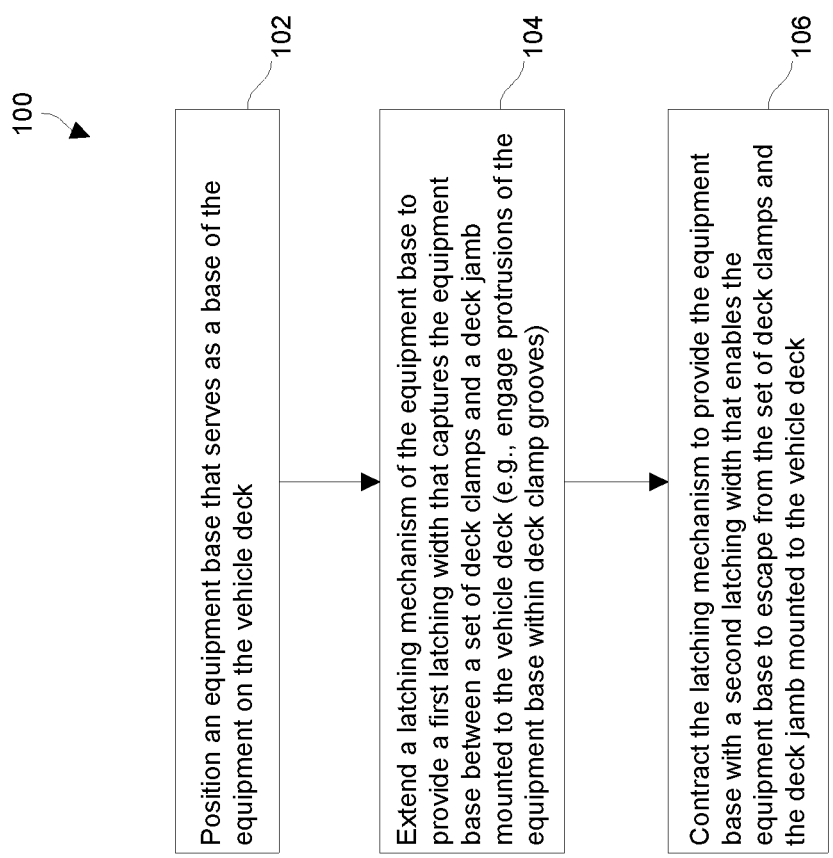
FIG. 5 is a flowchart of a procedure for controlling attachment of equipment to a vehicle deck in accordance with certain embodiments.

FIG. 5 is a flowchart of a procedure 100 to control attachment of equipment to a vehicle deck in accordance with certain embodiments. By way of example only, the procedure 100 uses a single latching assembly although in other arrangements, multiple latching assemblies are used. Such control enables the equipment to be fastened securely to the vehicle deck, and reliably removed from the vehicle deck. Such a procedure 100 may be performed quickly and with ease.

At 102, an equipment base that serves as a base of the equipment is positioned on the vehicle deck. In particular, the equipment base is rested on the vehicle deck so that the equipment base resides appropriately between the set of deck clamps and the deck jamb.

At 104, a latching mechanism of the equipment base is extended to provide a first latching width that captures the equipment base between the set of deck clamps and the deck jamb mounted to the vehicle deck. Along these lines, protrusions of the equipment base engage deck clamp grooves. In such a situation, a lever of the latching mechanism is in a first orientation in which the lever locks into place preventing the equipment base from inadvertently disengaging. Accordingly, the equipment is securely fastened to the vehicle deck.

At 106, the latching mechanism is contracted to provide the equipment base with a second latching width that enables the equipment base to escape from the set of deck clamps and the deck jamb mounted to the vehicle deck. In such a situation, the lever of the latching mechanism is moved from the first orientation to a second orientation. Accordingly, the equipment may be then moved so that the protrusions of the equipment base disengage from the deck clamp grooves. As a result, the equipment is now free to be lifted off of the vehicle deck.

As described above, improved techniques utilize a latching assembly 16 having a base 44 that extends to attach equipment 18 to a vehicle deck 14 and contracts to detach the equipment 18 from the vehicle deck 18. Such a latching assembly 16 enables the equipment 18 to fasten to the vehicle 10 and unfasten from the vehicle 10 more quickly and in a less burdensome manner than manipulating conventional nuts and bolts to mount/unmount the equipment 18 each time. Accordingly, such a latching assembly 16 is well suited for certain types of vehicles such as robotic vehicles that require quick deployment to address dangerous emergency situations.

While various embodiments of the present disclosure have been particularly shown and described, it will be understood by those skilled in the art that various changes in form and details may be made therein without departing from the spirit and scope of the present disclosure as defined by the appended claims.

For example, it should be understood that the equipment 18 may include other features that provide stability when attached to the vehicle deck 14. In accordance with certain embodiments, one or more latching assemblies 16 in combination with one or more supports (e.g., legs, walls, bases members, combinations thereof, etc.) may simultaneously support the equipment 18 on the vehicle deck 18.

In accordance with certain embodiments, the above described techniques provide for a lateral latching quick attachment system. Such a system is suitable generally for vehicle designs, and more particularly for attachment mechanisms that attach equipment to horizontal surfaces of vehicles.

One should appreciate that many vehicles are capable of receiving additional equipment that attaches to the vehicles and augments their functionality. For example, Howe & Howe, Incorporated of Waterboro, ME, manufactures a number of tracked vehicles that have detachable modules. Such vehicles can be adapted for a variety of applications, from firefighting to nuclear response.

Prior schemes for attaching equipment to vehicles may have primarily focused on the front or rear of the vehicles, rather than on the top. The attached equipment has included plows, moving decks, and graders, for example. Nevertheless, some equipment is more suitably placed on the top of the vehicle or on some other horizontal surface. Unfortunately, the prior attachment schemes do not provide an adequate solution. In addition, it would be desirable for an attachment scheme to be operable by human personnel, preferably without tools.

In accordance with certain embodiments, an improved technique addresses these challenges, in whole or in part, by providing an attachment mechanism for attaching equipment to a horizontal surface of a vehicle. The attachment mechanism includes a plurality of catch hooks and a jamb plate on the horizontal surface. Each of the catch hooks has a respective concave region that is open in a direction of the jamb plate, referred to herein as a "forward" direction. The concave regions are adapted to receive projecting members that extend from the equipment to be attached. Such equipment further includes a clamp, such as a locking toggle clamp. To attach the equipment to the vehicle, the equipment is placed on the horizontal surface such that projecting members of the equipment rest at openings of respective concave regions and the locking clamp faces the jamb plate. By operating the locking clamp, a plunger of the locking clamp is pressed forward against the jamb plate, causing the equipment to be pushed horizontally back such that the projections seat securely within the respective concave regions. The clamp may then be locked to secure the equipment to the horizontal surface. The equipment may be removed from the vehicle by following the reverse procedure.

In some aspects, the catch hooks are separate pieces that attach to the horizontal surface. In some aspects, the jamb plate is a separate part that attaches to the horizontal surface. In some arrangements, the horizontal surface has a plurality of holes therethrough, and the catch hooks and jamb plate are attached to the horizontal surface using bolts.

In some aspects, the horizontal surface has a grid hole pattern that includes regularly-spaced holes, and the catch hooks and jamb plate are attached to the horizontal surface via holes of the grid hole pattern.

In some examples, the catch hooks are arranged in laterally spaced pairs in which each catch hook of a pair is equidistant from the jamb plate. The jamb plate thus forms the apex of an isosceles triangle whose other vertices are the two catch hooks of the pair. In other examples, the catch hooks of a pair are not equidistant from the jamb plate and the triangle formed by the catch hooks of a pair and the jamb plate is not an isosceles triangle.

In some arrangements, multiple pairs of catch hooks are provided, e.g., in respective rows, with each pair forming a respective triangle with the jamb plate, the jamb plate thus forming an apex common to all of the pairs.

In some arrangements, the projections include a pair of bar segments that extend laterally from the equipment. The pair of bar segments is adapted to engage a pair of catch hooks, with each of the bar segments configured to engage the concave region of a respective catch hook. The bar segments may be separate bar segments. They may alternatively be segments of a single bar. In some arrangements multiple pairs of bar segments engage multiple pairs of catch hooks, e.g., in respective rows.

In some examples, the jamb plate and the plurality of catch hooks are disposed on a first side of the horizontal surface, and the attachment further includes a second jamb plate and a second plurality of catch hooks disposed on a second side of the horizontal surface. The second jamb plate and second plurality of catch hooks may be configured in any of the ways described above for the initially-described jamb plate and catch hooks.

In some examples, jamb plates and catch hooks are provided on both sides of the horizontal surface to accommodate equipment that requires a wide stance, such as a scissor lift.

Some embodiments are directed to a mechanism for attaching equipment to a horizontal surface of a vehicle. Other embodiments are directed to a vehicle surface that includes features for attaching to equipment. Still other embodiments are directed to equipment adapted to attach to a horizontal surface of a vehicle. Still other embodiments are directed to a method of attaching equipment to a horizontal surface of a vehicle.

In accordance with certain embodiments, at certain times the various techniques may provide partially disassembled components of an attachment mechanism for attaching equipment to a horizontal surface of a vehicle. Also see FIG. 2.

At other times, the equipment may be placed on the horizontal surface but not yet locked in place. Also see FIG. 3.

At yet other times, the equipment may be placed on the horizontal surface and locked in place. Also see FIG. 4.

An improved technique for attaching equipment to a horizontal surface of a vehicle employs an attachment mechanism having a plurality of catch hooks and a jamb plate on the horizontal surface. Each of the catch hooks is configured to engage with a respective projection from the equipment to be attached, and the jamb plate is configured to engage a clamp on the equipment. When activated, the clamp forces the projections into the catch hooks and locks the equipment in place.

The firefighting robot is designed to accept various equipment (also referred to herein as "implements") onto the robot to assist firefighters in a variety of ways. The disclosed solution technique makes swapping equipment simple and requires no tools. It also accommodates equipment such as ventilators, high pressure foam systems, foam concentrate storage tanks, and the like, which are more suitably attached to the top of the vehicle than to the front or rear.

The catch hooks, projections, and jamb plate are preferably made of metal, such as mild steel. The catch hooks and jamb plate are preferably attached to the horizontal surface of the vehicle using nuts and bolts, with the bolts passing through holes that are part of a grid pattern of holes formed in the horizontal surface. A suitable example of the illustrated clamp is the model 630-R straight line action clamp, available from Destaco of Auburn Hills, MI. Similar products are available from multiple sources, and other types of clamps may be used.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the disclosure. Such modifications and enhancements are intended to belong to various embodiments of the disclosure.

What is claimed is:

1. A vehicle, comprising:
   a vehicle chassis constructed and arranged to move over terrain;
   a vehicle deck supported by the vehicle chassis; and
   a latching assembly that attaches equipment to the vehicle deck, the latching assembly including:
      a set of deck clamps that mounts to a set of clamp locations on the vehicle deck,
      a deck jamb that mounts to a jamb location on the vehicle deck, and
      an equipment base that serves as a base of the equipment, the equipment base providing a latching mechanism that extends to provide the equipment base with a first latching width that captures the equipment base between the set of deck clamps and the deck jamb and contracts to provide the equipment base with a second latching width that enables the equipment base to escape from the set of deck clamps and the deck jamb;
   wherein a base member of the equipment base defines a top face and a bottom face opposite the top face, wherein the bottom face is constructed and arranged to continuously contact the vehicle deck to support the equipment; and
   wherein the latching mechanism is mounted on the top face of the base member.

2. A vehicle as in claim 1 wherein the equipment base includes:
   a latching member, and
   a lever constructed and arranged to transition between a first orientation and a second orientation relative to the base member, the lever and the latching member forming the latching mechanism which positions the latching member and the base member (i) in a first configuration that provides the first latching width when the lever is in the first orientation relative to the base member and (ii) in a second configuration that provides the second latching width when the lever is in the second orientation relative to the base member.

3. A vehicle as in claim 2 wherein the vehicle deck provides a horizontal surface; and
   wherein the lever pivots about an axis that is parallel to the horizontal surface.

4. A vehicle as in claim 2 wherein the base member defines a set of protrusions;
   wherein the latching member defines a plunger tip;
   wherein the set of protrusions and the plunger tip are separated by the first latching width when the lever is in the first orientation relative to the base member; and
   wherein the set of protrusions and the plunger tip are separated by the second latching width when the lever is in the second orientation relative to the base member.

5. A vehicle as in claim 2 wherein the base member extends laterally to continuously contact vehicle deck to support the equipment when the lever is in the first orientation relative to the base member to latch the base member to the vehicle deck.

6. A vehicle as in claim 2 wherein the vehicle deck defines a pattern of holes;
   wherein each deck clamp includes a flat portion defining a set of holes to align with at least one hole of the pattern of holes defined by the vehicle deck to enable hardware to fasten that deck clamp to the vehicle deck; and
   wherein the deck jamb includes a flat portion defining a set of holes to align with at least one hole of the pattern of holes defined by the vehicle deck to enable hardware to fasten the deck jamb to the vehicle deck.

7. A vehicle as in claim 6 wherein each deck clamp further includes a hook portion coupled with the flat portion of that deck clamp;
   wherein the deck jamb further includes a stop portion coupled with the flat portion of the deck jamb; and
   wherein the hook portion of each deck clamp defines a groove that is separated from the stop portion of the deck jamb by the first latching width.

8. A vehicle as in claim 7 wherein the stop portion of the deck jamb defines an orifice that receives a plunger tip at an end of the latching member.

9. A vehicle as in claim 2 wherein the set of deck clamps includes a pair of deck clamps disposed on the vehicle deck adjacent an end of the vehicle; and
   wherein the deck jamb is disposed on the vehicle deck adjacent another end of the vehicle.

10. A vehicle as in claim 9 wherein the latching assembly further includes:
a second pair of deck clamps disposed on the vehicle deck at a mid-region between the ends of the vehicle; and
wherein the base member defines multiple pairs of protrusions to engage the pair of deck clamps and the second pair of deck clamps.

11. A vehicle as in claim 1, further comprising:
a second latching assembly that attaches the equipment to the vehicle deck, the second latching assembly including:
a second set of deck clamps that mounts to a second set of clamp locations on the vehicle deck,
a second deck jamb that mounts to a second jamb location on the vehicle deck, and
a second equipment base that serves as a second base of the equipment, the second equipment base providing a second latching mechanism that extends to provide the second equipment base with the first latching width that captures the second equipment base between the second set of deck clamps and the second deck jamb and contracts to provide the second equipment base with the second latching width that enables the second equipment base to escape from the second set of deck clamps and the second deck jamb.

12. A vehicle as in claim 11 wherein the equipment base is elongated in shape and extends along an equipment base axis;
wherein the second equipment base is elongated in shape and extends along a second equipment base axis; and
wherein the equipment base and the second equipment base are constructed and arranged to attach to the vehicle deck with the equipment base axis parallel to the second equipment base axis.

13. A vehicle as in claim 12 wherein the equipment includes a scissor lift; and
wherein the equipment base and the second equipment base forms a bottom of the scissor lift.

14. A vehicle as in claim 13 wherein the equipment further includes:
actuators coupled with the equipment bases, the actuators being constructed and arranged to control height of the scissor lift.

15. A latching assembly for attaching equipment to a vehicle deck, the latching assembly comprising:
a set of deck clamps constructed and arranged to mount to a set of clamp locations on the vehicle deck;
a deck jamb constructed and arranged to mount to a jamb location on the vehicle deck; and
an equipment base constructed and arranged to serve as a base of the equipment, the equipment base providing a latching mechanism that, when the set of deck clamps mounts to the set of clamp locations on the vehicle deck and the deck jamb mounts to the jamb location on the vehicle deck, extends to provide the equipment base with a first latching width that captures the equipment base between the set of deck clamps and the deck jamb and contracts to provide the equipment base with a second latching width that enables the equipment base to escape from the set of deck clamps and the deck jamb;
wherein a base member of the equipment base defines a top face and a bottom face opposite the top face, wherein the bottom face is constructed and arranged to continuously contact the vehicle deck to support the equipment; and
wherein the latching mechanism is mounted on the top face of the base member.

16. A method of controlling attachment of equipment to a vehicle deck, the method comprising:
positioning an equipment base that serves as a base of the equipment on the vehicle deck; and
extending a latching mechanism of the equipment base to provide a first latching width that captures the equipment base between a set of deck clamps and a deck jamb mounted to the vehicle deck; and
contracting the latching mechanism to provide the equipment base with a second latching width that enables the equipment base to escape from the set of deck clamps and the deck jamb mounted to the vehicle deck;
wherein a base member of the equipment base defines a top face and a bottom face opposite the top face, wherein the bottom face is constructed and arranged to continuously contact the vehicle deck to support the equipment; and
wherein the latching mechanism is mounted on the top face of the base member.

17. The vehicle as in claim 1 wherein the latching mechanism and includes a latching member constructed and arranged to move linearly along an axis horizontal to the vehicle deck, the latching member defining an end face constructed and arranged to abut the deck jamb to capture the equipment base between the set of deck clamps and the deck jamb.

18. The vehicle as in claim 1 wherein the set of deck clamps includes a respective set of hook portions constructed and arranged to receive a set of protrusions of the equipment base;
wherein the deck jamb includes a stop portion that defines a surface that faces the set of hook portions; and
wherein the latching mechanism is constructed and arranged to press against the surface that faces the set of hook portions to push the set of protrusions towards the set of hook portions.

* * * * *